(12) United States Patent
Cha et al.

(10) Patent No.: US 10,766,543 B2
(45) Date of Patent: Sep. 8, 2020

(54) JOINT MEMBER FOR COUPLING CHASSIS FRAME AND VARIABLE CHASSIS MODULE OF VEHICLE USING THE SAME

(71) Applicant: KOREA INSTITUTE OF INDUSTRIAL TECHNOLOGY, Cheonan-si, Chungcheongnam-do (KR)

(72) Inventors: Hyun Rok Cha, Gwangju (KR); Myeong Hwan Hwang, Gwangju (KR); Jong Ho Han, Gwangju (KR); Dong Hyun Kim, Gwangju (KR); Gil Woo Choi, Gwangju (KR); Se Hyeon Yang, Gwangju (KR); Gye Seong Lee, Gwangju (KR); Hae Sol Lee, Gwangju (KR)

(73) Assignee: KOREA INSTITUTE OF INDUSTRIAL TECHNOLOGY, Cheonan-si, Chungcheongnam-Do (KR)

( * ) Notice: Subject to any disclaimer, the term of this patent is extended or adjusted under 35 U.S.C. 154(b) by 5 days.

(21) Appl. No.: 16/212,562

(22) Filed: Dec. 6, 2018

(65) Prior Publication Data
US 2020/0164926 A1 May 28, 2020

(30) Foreign Application Priority Data
Nov. 26, 2018 (KR) ........................ 10-2018-0147046

(51) Int. Cl.
*B62D 27/02* (2006.01)
*B62D 21/18* (2006.01)

(52) U.S. Cl.
CPC ......... *B62D 27/023* (2013.01); *B62D 21/186* (2013.01)

(58) Field of Classification Search
CPC ........................... B62D 27/023; B62D 21/186
See application file for complete search history.

(56) References Cited

U.S. PATENT DOCUMENTS

| 2,389,907 | A | * | 11/1945 | Helmuth | B62D 23/005 |
| | | | | | 296/203.01 |
| 5,180,069 | A | * | 1/1993 | Krummell | B65G 1/026 |
| | | | | | 211/151 |
| 5,320,403 | A | * | 6/1994 | Kazyak | B62D 23/005 |
| | | | | | 296/203.01 |
| 5,415,300 | A | * | 5/1995 | Krummell | B65G 1/026 |
| | | | | | 211/151 |
| 5,715,643 | A | * | 2/1998 | Parkinson | B62D 23/005 |
| | | | | | 52/656.9 |

(Continued)

FOREIGN PATENT DOCUMENTS

| DE | 1580762 A1 | * | 6/1970 | ............ | B60G 1/00 |
| JP | 2001199247 A | * | 7/2001 | | |

(Continued)

*Primary Examiner* — Nicole T Verley
(74) *Attorney, Agent, or Firm* — Cantor Colburn LLP

(57) ABSTRACT

A joint member for coupling a chassis frame according to the present invention, which couples frames composing a chassis, includes a block-shaped main body and a first insertion groove into which one end portion of a first frame, which is a frame extending in a width direction of the chassis, is inserted and which is formed on one surface of the main body, and the plurality of first insertion grooves are formed in a longitudinal direction of the chassis so that a length of the chassis is changed according to a position at which the first frame is inserted.

20 Claims, 12 Drawing Sheets

(56) References Cited

U.S. PATENT DOCUMENTS

| | | | | |
|---|---|---|---|---|
| 6,129,223 | A * | 10/2000 | Krummell, Jr. | B65G 1/026 211/151 |
| 6,402,414 | B1 * | 6/2002 | Kanodia | B62D 23/005 296/205 |
| 6,665,935 | B2 * | 12/2003 | Panoz | B62D 23/00 280/785 |
| 7,140,503 | B2 * | 11/2006 | Krummell, Jr. | A47F 10/04 211/151 |
| 7,503,623 | B2 * | 3/2009 | Favaretto | B62D 23/005 280/798 |
| 7,559,221 | B2 * | 7/2009 | Horita | C22F 1/00 148/558 |
| 8,163,116 | B2 * | 4/2012 | Riley | B62D 23/005 156/294 |
| 8,342,598 | B2 * | 1/2013 | Stanton | B62D 25/2036 296/191 |
| 8,414,068 | B1 * | 4/2013 | Na | B62D 27/023 296/193.06 |
| 8,739,985 | B2 * | 6/2014 | Krummell | B65G 1/026 211/151 |
| 9,126,630 | B1 * | 9/2015 | Gallagher | B62D 27/023 |
| 10,000,238 | B2 * | 6/2018 | Buschjohann | B62D 21/02 |
| D867,108 | S * | 11/2019 | Bowron | D8/354 |
| 10,513,295 | B2 * | 12/2019 | Takahashi | B62D 25/2036 |
| 10,526,016 | B2 * | 1/2020 | Takii | B62D 21/152 |
| 10,640,154 | B2 * | 5/2020 | Takii | B62D 27/065 |
| 2019/0047628 | A1 * | 2/2019 | Kawase | B62D 25/025 |
| 2019/0061834 | A1 * | 2/2019 | Sangha | B62D 29/008 |
| 2019/0300075 | A1 * | 10/2019 | Wiberg | B62D 25/2054 |

FOREIGN PATENT DOCUMENTS

| | | | |
|---|---|---|---|
| JP | 2002114114 A | * | 4/2002 |
| JP | 2008057623 A | * | 3/2008 |
| KR | 10-1610513 B1 | | 4/2016 |
| KR | 10-1770944 B1 | | 8/2017 |

* cited by examiner

JOINT MEMBER FOR COUPLING CHASSIS FRAME AND VARIABLE CHASSIS MODULE OF VEHICLE USING THE SAME

CROSS-REFERENCE TO RELATED APPLICATION

This application claims priority to and the benefit of Korean Patent Application No. 2018-0147046, filed on Nov. 26, 2018, the disclosure of which is incorporated herein by reference in its entirety.

BACKGROUND

1. Field of the Invention

The present invention relates to a joint member for coupling a chassis frame and a variable chassis module of a vehicle using the same, and more specifically, to a joint member for coupling a chassis frame, which includes a plurality of positions at which frames are coupled and which are formed on the joint member to which a frame forming a chassis is coupled so that a length and width of the chassis are easily changed according to a position at which the frame is coupled so as to allow a chassis frame of a vehicle for small quantity batch production to be easily manufactured even when the same component is used, and a variable chassis module of a vehicle using the same.

This research was supported by the Fusion and Convergence Development of Manufacturing Technology Program of the Ministry of Science and ICT, Republic of Korea under the supervision of Korea Institute of Industrial Technology (Project No. KITECH EO-18-0020). This research was also supported by the Industrial Technology Innovation Program of the Ministry of Trade, Industry and Energy, Republic of Korea under the supervision of Korea Institute for Advancement of Technology (Project No. 20162020107660).

2. Discussion of Related Art

Generally, vehicles include an ordinary vehicle, an electric vehicle, and a working vehicle, such as a tractor, and structures of the vehicle are mainly classified into a lower structure commonly called as a chassis and an upper structure commonly called as a vehicle body or a body.

Since the vehicles have widths and lengths of the chassis varying according to models, a method in which components of different sizes, such as a frame, etc., used to manufacture chassis are separately manufactured and managed by a model of a produced vehicle has been used in a conventional vehicle production line.

However, the above-described conventional vehicle production method does not have a problem in mass-production for a few kind of product, such as conventional vehicle production, but a vehicle production method for small quantity batch production for various kind of product, such as production of a recently developed electric vehicle, a working vehicle, or the like, has problems of increased production costs of a vehicle due to an increase in costs for manufacturing and managing components and decreased production efficiency due to an increase in failure rate due to using components in a mixed manner.

A technique of manufacturing chassis of various sizes using the same component is required to solve the problems of the conventional technique, and in this context, technique for a chassis structure of a vehicle which changes a vehicle width is disclosed in the following Patent Document 1, Patent Document 2, and the like.

However, only a structure which changes a vehicle width according to a road circumstance while a produced vehicle is driven is disclosed even in the following related art but is not related to the technique of manufacturing chassis of various sizes using the same component in a step of producing a vehicle, and thus the technique still has the above-described problems of the conventional technique.

[Patent Document 1] Korean Patent Registration No. 10-1770944 (published on Aug. 24, 2017)

[Patent Document 2] Korean Patent Registration No. 10-1610513 (published on Apr. 20, 2016)

SUMMARY OF THE INVENTION

The present invention is directed to providing a joint member for coupling a chassis frame, which includes a plurality of positions at which a frame is coupled and which are formed on the joint member to which the frame forming a chassis is coupled so that a length and width of the chassis are easily changed according to a position at which the frame is coupled so as to allow a chassis frame of a vehicle for small quantity batch production for various kind of product to be easily manufactured even when the same component is used, and a variable chassis module of a vehicle using the same.

According to an aspect of the present invention, there is provided a joint member for coupling a chassis frame which couples frames composing a chassis and includes a main body having a block shape and a first insertion groove into which one end portion of a first frame, which is a frame extending in a width direction of the chassis, is inserted and which is formed in plural on one surface of the main body, and the plurality of first insertion grooves are formed in a longitudinal direction of the chassis so that the length of the chassis is changed according to a position at which the first frame is inserted.

At least a part of the first insertion grooves may be formed at different positions in a width direction of the chassis so that a width of the chassis is changed according to a position at which the first frame is inserted.

At least a part of the first insertion grooves may have different depths so that a width of the chassis is changed according to a position at which the first frame is inserted.

The joint member for coupling a chassis frame may further include a second insertion groove into which one end portion of a second frame, which is a frame connected to a front end module or a rear end module of a vehicle, is inserted and which is formed on another surface of the main body.

The second insertion groove may be formed on a protruding part protruding and extending upward from an upper surface of the main body.

According to another aspect of the present invention, there is provided a variable chassis module of a vehicle, in which a plurality of frames coupled to each other form a chassis module, which includes a main frame which has a rectangular shape, joint frames each extending from edges of the main frame outward in a lateral directions, which is a width direction of the chassis module, and joint members each coupled to the joint frames, wherein each of the joint members includes a first insertion groove which is formed in plural on one surface facing the joint frame so that an end portion of the joint frame is inserted thereinto, and the plurality of first insertion grooves are formed in a longitudinal direction of the chassis module so that a length of the chassis module is changed according to a position at which the joint frame is inserted.

At least a part of the first insertion grooves of each of the joint members may be formed at different positions in a width direction of the chassis module so that a width of the chassis module is changed according to a position at which the joint frame is inserted.

At least a part of the first insertion grooves of each of the joint members may have different depths so that a width of the chassis module is changed according to a position at which the joint frame is inserted.

The variable chassis module of a vehicle may further include a pair of front end module frames connected with a front end module of the vehicle and each disposed in the left and right directions of the main frame and a pair of rear end module frames connected with a rear end module of the vehicle and each disposed in the left and right directions of the main frame, wherein a second insertion groove into which any one of the front end module frames is inserted may be formed on one side of each of the joint members coupled to the joint frames extending from upper edges of the main frame, and a third insertion groove into which any one of the rear end module frames is inserted is formed on one side of each of the joint members coupled to the joint frames extending from lower edges of the main frame.

The variable chassis module of a vehicle may further include a pair of side frames disposed on laterally outsides of the main frame in a longitudinal direction of the chassis module, wherein each of the joint members may include a fourth insertion groove formed on one surface facing the side frames so that one end portion of the side frame is inserted thereinto.

According to still another aspect of the present invention, there is provided a joint member for coupling a chassis frame which couples frames composing a chassis and includes a main body having a block shape, a first insertion groove into which one end portion of a horizontal frame, which is a width-directional frame of the chassis, is inserted and which is formed in plural on a first side surface of the main body, and a second insertion groove into which one end portion of a vertical frame, which is a longitudinal direction of the chassis, is inserted and which is formed on a second side surface of the main body, the second side being adjacent to the first surface, wherein the plurality of first insertion grooves are formed in a longitudinal direction of the chassis so that a length of the chassis is changed according to a position at which the horizontal frame is inserted.

An insertion depth of the vertical frame inserted into the second insertion groove may be changed according to a case when a length of the chassis is changed according to a position at which the horizontal frame is inserted.

According to still another aspect of the present invention, there is provided a variable chassis module of a vehicle, in which a plurality of frames coupled to each other form a chassis module, which includes a pair of horizontal frames disposed to be spaced apart from each other in a vertical direction, a pair of vertical frames each disposed in left and right directions of the horizontal frame, and a joint member connected to each of edges of a rectangular shape so that the horizontal frames and the vertical frames are coupled to each other in the rectangular shape, wherein the joint member includes a first insertion groove formed in plural on a first side surface facing the horizontal frame so that one end portion of the horizontal frame is inserted thereinto, and a second insertion groove formed on a second side surface facing the vertical frame so that one end portion of the vertical frame is inserted thereinto, and the plurality of first insertion grooves are formed in a longitudinal direction of the chassis module so that a length of the chassis module is changed according to a position at which the horizontal frame is inserted.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Embodiments of the present invention have been described with reference to the accompanying drawings, but the present invention is not limited thereto. Embodiments of the present invention may be implemented in several forms different from the illustrated embodiment.

Throughout the specification, when an element is referred to as being "connected (coupled or in contact with)" to another element, the element may be "directly connected," thereto or "indirectly coupled" to intervening elements.

Throughout the specification, when an element is referred to as "including" a constituent element, other constituent elements may be further included not excluded unless otherwise described.

Further, throughout the specification, singular forms used herein are intended to include plural forms unless explicitly indicated otherwise.

Hereinafter, exemplary embodiments of the present invention will be described in detail with reference to the accompanying drawings.

In the present invention, an example of a chassis for an electric vehicle will be described for convenience of description, but the present invention is not limited thereto. The present invention may even be applied to chassis for various working vehicles as well as a conventional vehicle.

First Embodiment

Figure 1:
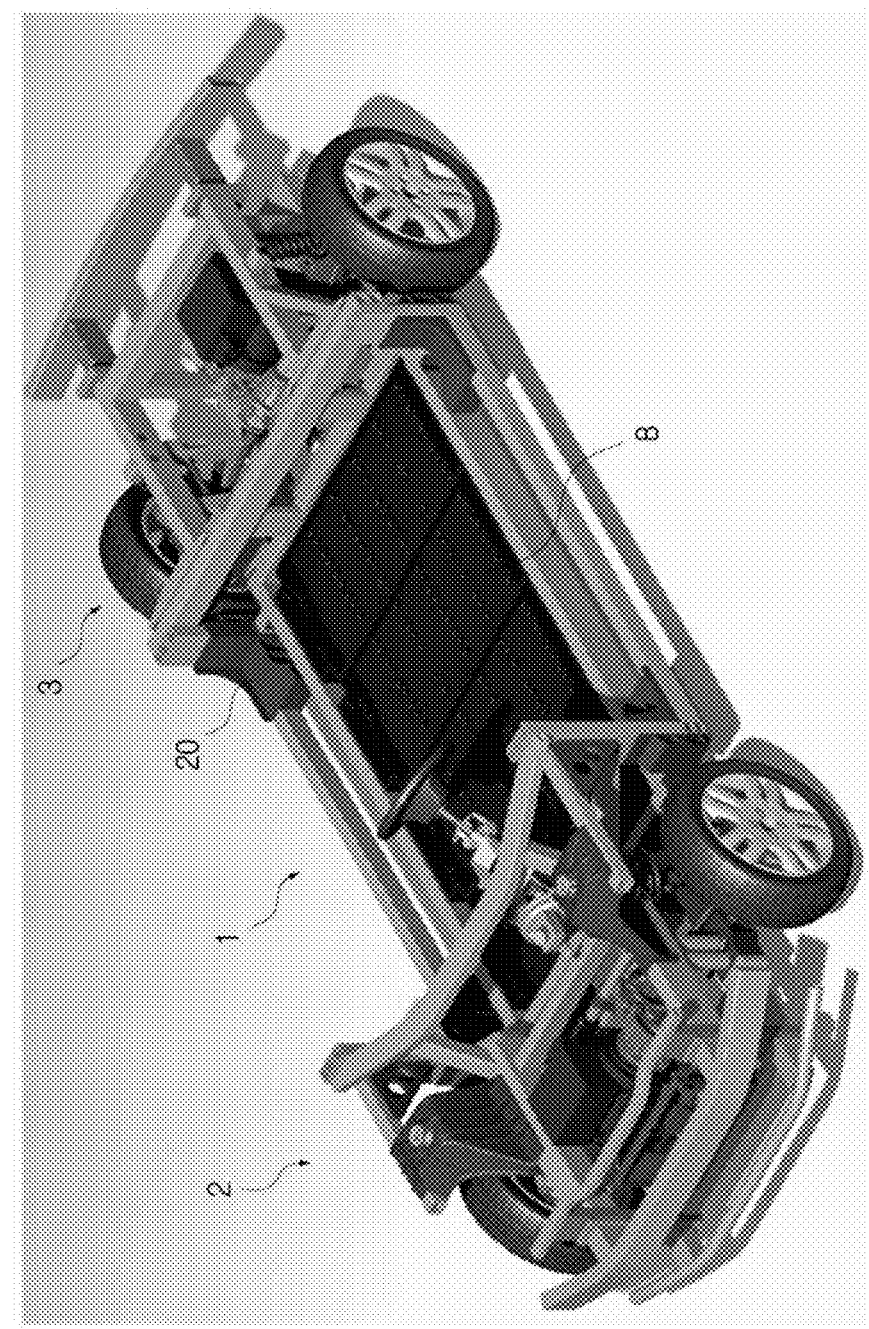
FIG. 1 is a view showing a whole configuration of a chassis to which a joint member for coupling a chassis frame according to a first embodiment of the present invention is applied.
Figure 2:
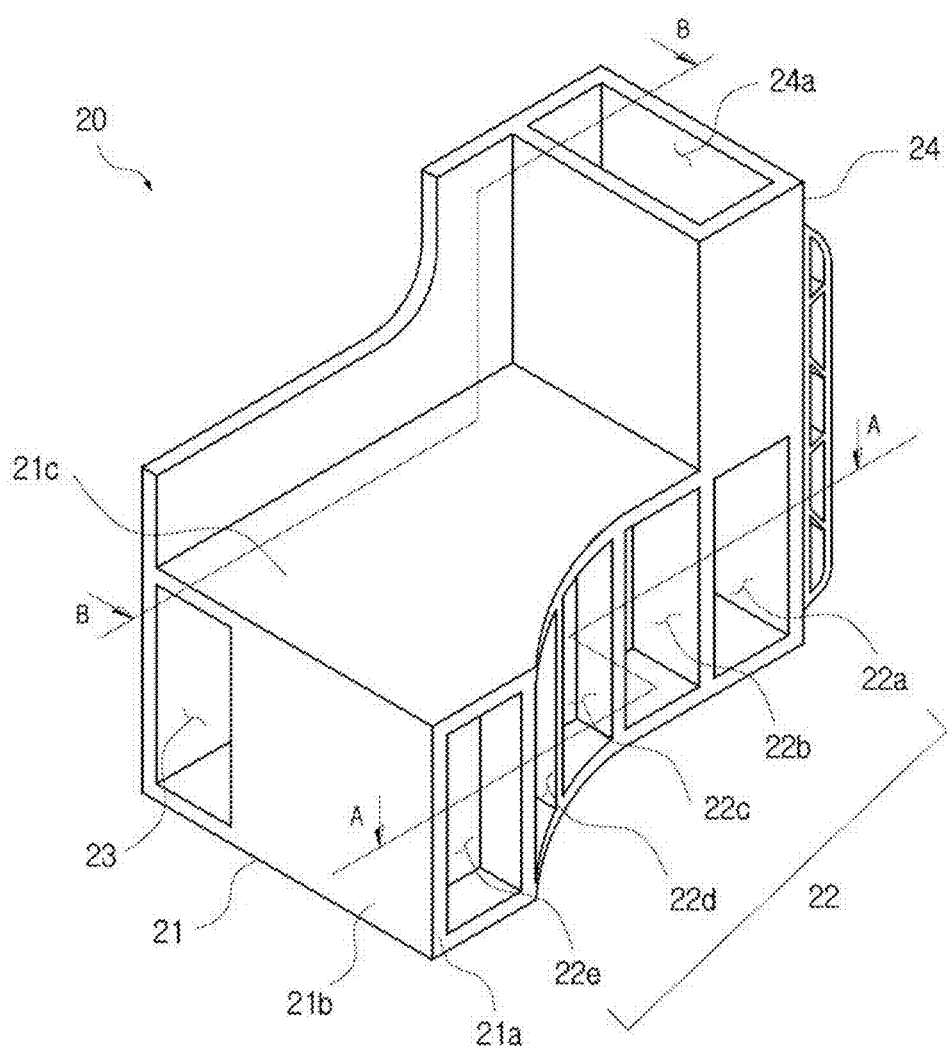
FIGS. 2 to 4 are a perspective view, a cross-sectional view taken along a line A-A, and a cross-sectional view taken along a line B-B of the joint member for coupling a chassis frame according to the first embodiment of the present invention.
Figure 3:
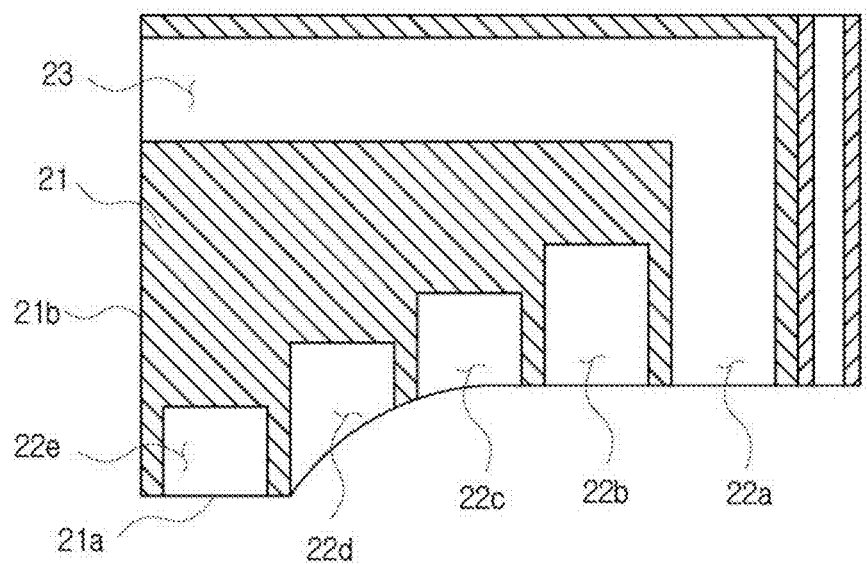
Figure 4:
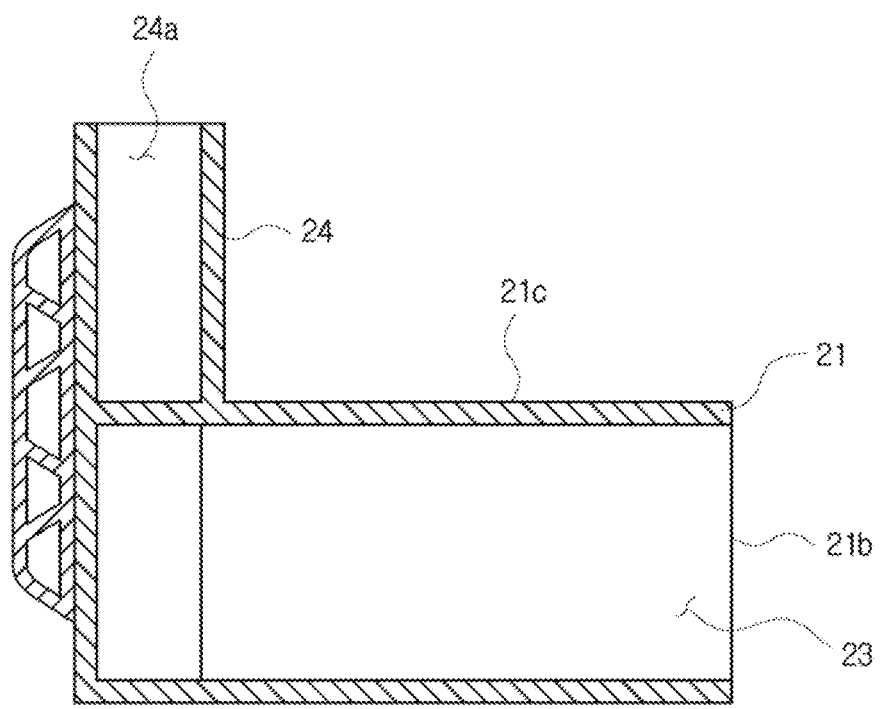

FIG. 1 is a view showing a whole configuration of a chassis to which a joint member for coupling a chassis frame according to a first embodiment of the present invention is applied, and FIGS. 2 to 4 are a perspective view, a cross-sectional view taken along a line A-A, and a cross-sectional view taken along a line B-B of the joint member for coupling a chassis frame according to the first embodiment of the present invention.

Figure 5:
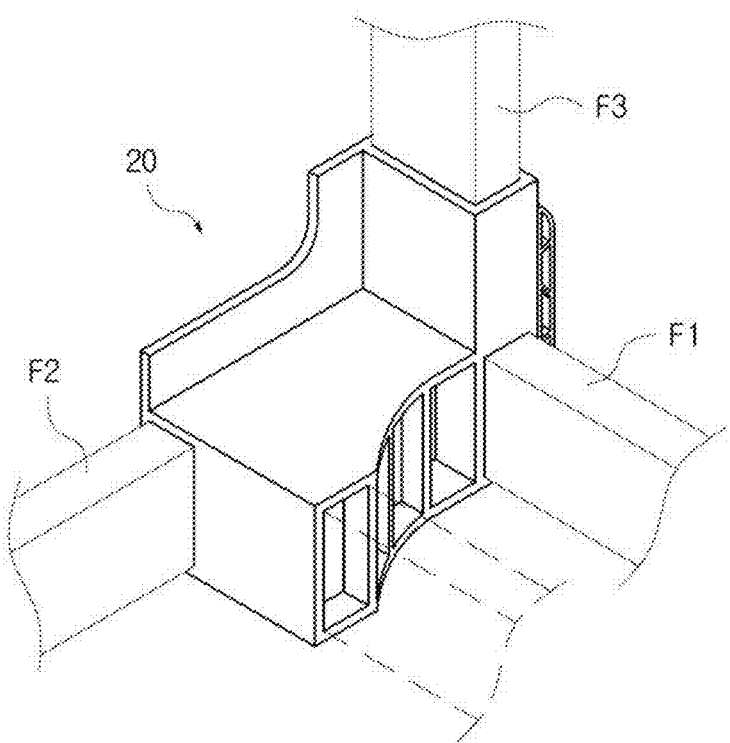
FIG. 5 is a view showing a state in which a chassis frame is coupled to the joint member for coupling a chassis frame according to the first embodiment of the present invention.

FIG. 5 is a view showing a state in which a chassis frame is coupled to the joint member for coupling a chassis frame according to the first embodiment of the present invention A joint member 20 for coupling a chassis frame according to the embodiment of the present invention is a constituent element used to couple beams or bar-shaped frames composing a center module 1 of a chassis formed in a flat plate shape, and a front end module 2 and a rear end module 3 each coupled to a front end and a rear end of the center module 1.

The center module 1 is a component performing a function of supporting a body at a lower portion of a vehicle and, in the embodiment, may include a battery module B for operating an electric vehicle.

Further, the front end module 2 is a component in which a motor system operating a vehicle, a front wheel system, a steering wheel system, a cooling system, other vehicle supporting frames, and the like are installed, and the rear end module 3 is a component in which a rear wheel system operating a vehicle, other vehicle supporting frame, and the like are installed.

Meanwhile, the joint member 20 includes a block-shaped main body 21 and a plurality of insertion grooves 22 formed on one surface 21a of the main body 21, and one end portion of a first frame F1, which is a frame extending in a width direction of the chassis, is inserted into the insertion groove 22.

In this case, the first frame F1 is a horizontal frame elongating in a width direction of the chassis, and the one surface 21a is a surface facing an end of the first frame F1.

Further, the plurality of insertion grooves 22 are formed to be spaced apart from each other in a longitudinal direction of the chassis so that a length of the chassis is changed according to a position at which the first frame F1 is inserted when the chassis is manufactured.

In the embodiment of the present invention, as an example, the five insertion grooves 22 are formed, and the insertion grooves (22a to 22e) each are formed sequentially in order of an insertion groove 22a, an insertion groove 22b, an insertion groove 22c, an insertion groove 22d, and an insertion groove 22e in a direction from a front end of one surface 21a of the body to a rear end thereof (that is, a longitudinal direction of the chassis) to be spaced apart from each other.

In the joint member 20 for coupling a chassis frame according to the present invention, a length of the chassis may be easily changed according to a position at which the first frame F1 is inserted.

As an example, when the joint member 20 is a component coupled to an upper left side of the chassis, a length of the chassis is the minimum when the first frame F1 is inserted into the insertion groove 22a, and a length of the chassis is the maximum when the first frame F1 is inserted into the insertion groove 22e.

Further, at least a part of the insertion grooves 22 may be formed at different positions in the width direction of chassis so that the width of chassis is changed according to a position at which the first frame F1 is inserted.

In the embodiment, since one surface 21a of the main body is a curved surface inclined in a longitudinal direction of the chassis, the insertion grooves 22a to 22e are each formed at different positions in the width direction of chassis when the insertion groove 22 is formed in a direction from a front end of the one surface 21a of the main body to a rear end thereof.

In such a configuration, since a position of one end portion of the first frame F1 is changed in a width direction of chassis according to an insertion position, the width of chassis may be changed.

In the embodiment of the present invention, at least a part of the insertion grooves 22 have different depths to further increase a range in which the width of chassis is changed, and in this case, since an insertion length of one end of the first frame F1 is changed according to an insertion position, the width of chassis may be further changed.

In such a configuration, the joint member 20 according to the present invention may simultaneously change a length and width of chassis according to a position at which the first frame F1 is inserted into one surface 21a of the main body.

As an example, in the embodiment, the insertion grooves 22 may be formed in a form that a length and width of the chassis are increased or decreased in an interworking manner according to a position at which the first frame F1 is inserted but are not limited thereto and may be formed in various forms.

That is, the insertion grooves 22 may be formed so that a length of the chassis is decreased when a width of chassis is increased according to a position at which the first frame F1 is inserted or a length of the chassis is increased when the width of chassis is decreased so as to allow the chassis to be manufactured in various sizes and shapes.

Further, the joint member 20 further includes an insertion groove 23 formed at another surface 21b which is adjacent to the one surface 21a of the main body, and one end portion of a second frame F2, which is a frame extending in a longitudinal direction of the chassis, is inserted into the insertion groove 23.

In this case, the second frame F2 is a vertical frame elongating a longitudinal direction of the chassis, and the another surface 21b of the main body is a surface facing an end portion of the second frame F2.

Further, it is preferable that the insertion groove 23 has a depth which is deep enough to adjust an insertion length of one end portion of the second frame F2, and as described above, the insertion depth of the second frame F2 inserted into the insertion groove 23 may be changed according to a case when a length of the chassis is changed according to a position at which the first frame F1 is inserted into the insertion groove 22.

Further, the joint member 20 further includes an insertion groove 24a formed on one side of the body 21, and one end portion of a third frame F3, which is a frame connected with a front end module 2 or a rear end module 3 of the vehicle, is inserted into the insertion groove 24a.

As an example, in the embodiment, the insertion groove 24a is formed on an upper surface of a protruding part 24 protruding and extending upward from an upper surface 21c of the main body, and the third frame F3 is formed as a perpendicularly elongated frame but they are not limited thereto, and the protruding part 24 and the third frame F3 may be formed in various forms as needed.

That is, the third frame F3 may be formed to be elongated and inclined in a perpendicular direction or to elongate in a longitudinal direction of chassis as needed, and in each case, the protruding part 24 may have an insertion groove 24a into which the third frame F2 is inserted.

Further, the joint member 20 may further include a reinforcing plate (not shown) for connecting an upper surface 21c of the main body with the protruding part 24 to reinforce strength of a portion at which the main body 21 and the protruding part 24 are bonded, and a truss member (not shown) for connecting the main body 21 and the protruding part 24.

The first frame F1, the second frame F2, and the third frame F3 each inserted into the insertion grooves of the joint member 20 for coupling a chassis frame according to the present invention configured as described above are integrally coupled to the main body 21 by welding, bolt coupling, or the like.

Second Embodiment

Figure 6:
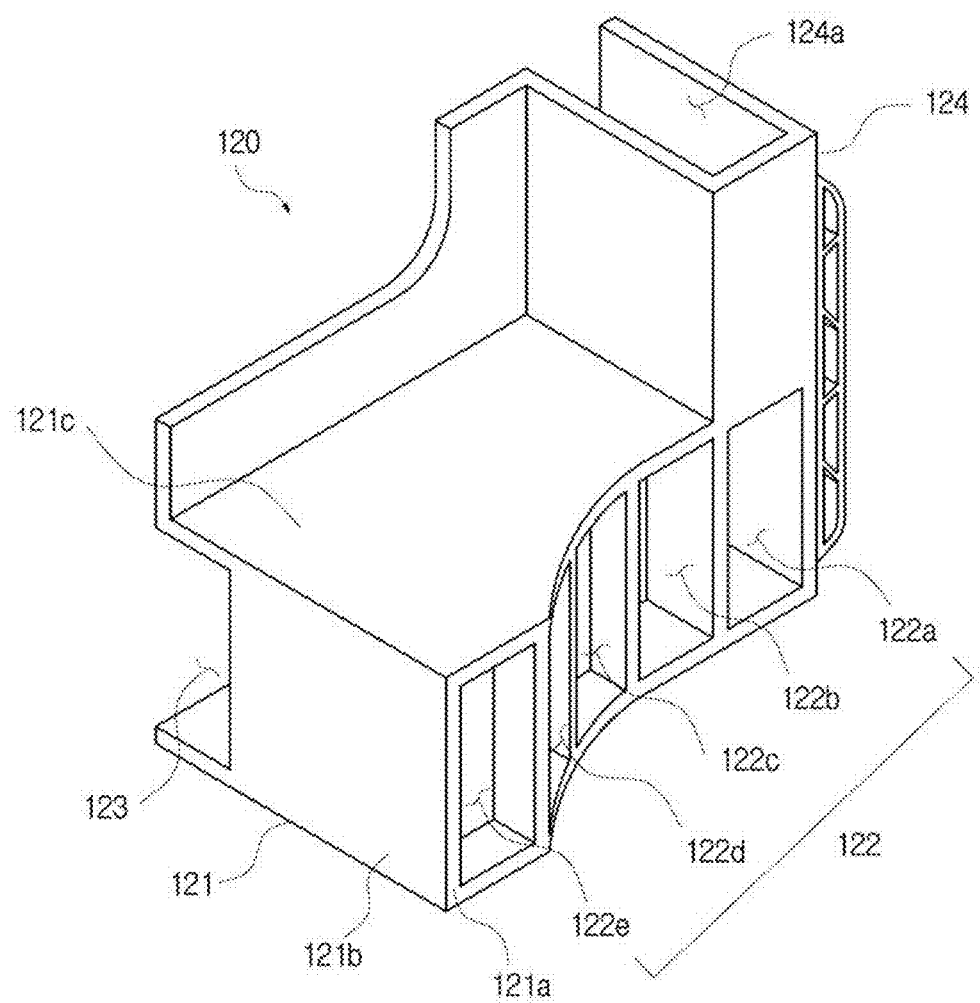
FIG. 6 is a perspective view of a joint member for coupling a chassis frame according to a second embodiment of the present invention.
Figure 7:
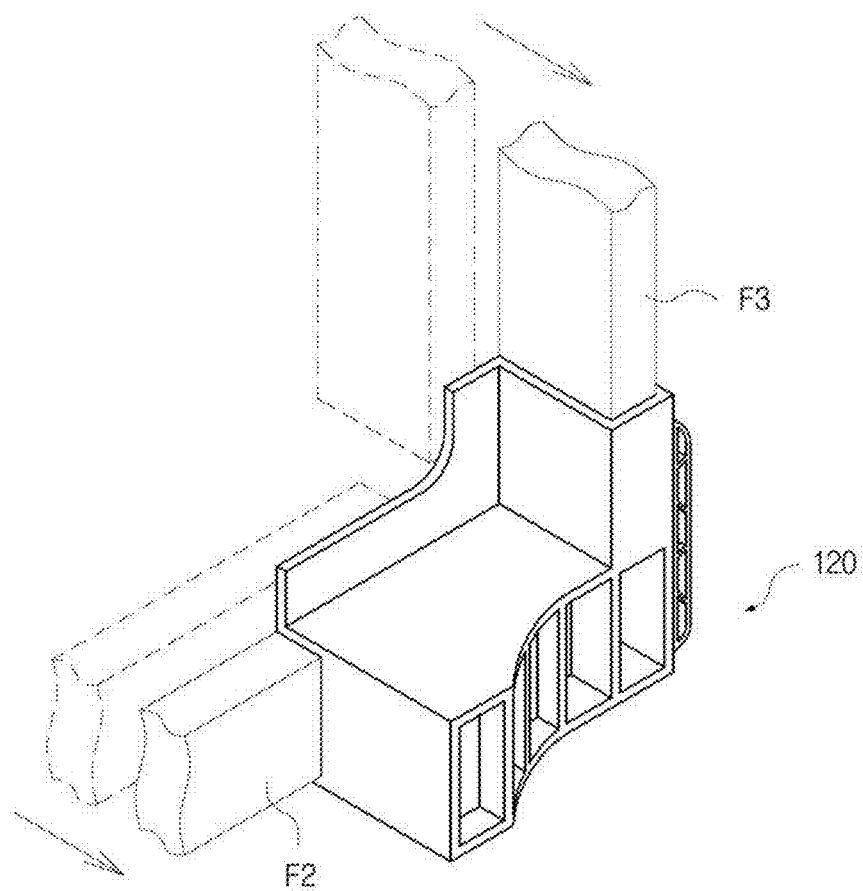
FIG. 7 is a view showing a state in which a chassis frame is coupled to the joint member for coupling a chassis frame according to the second embodiment of the present invention.

FIG. 6 is a perspective view of a joint member for coupling a chassis frame according to a second embodiment of the present invention, and FIG. 7 is a view showing a state in which a chassis frame is coupled to the joint member for coupling a chassis frame according to the second embodiment of the present invention.

When compared to the above-described first embodiment, a joint member 120 for coupling a chassis frame according to the embodiment is different only in a shape of a part of the insertion grooves, and thus a repeated description of the first embodiment will be omitted.

The joint member 120 according to the embodiment includes a block-shaped main body 121 and a plurality of insertion grooves 122 which are formed on one surface 121a of the main body 121 and into which one end portion of the first frame F1 is inserted.

Further, the joint member 120 further includes an insertion groove 123 which is formed on another surface 121b of the main body 121 and into which one end portion of the second frame F2 is inserted and an insertion groove 124a which is formed on one side of the main body 121 and into which one end portion of the third frame F3 is inserted.

In this case, the insertion groove 124a is formed on one side of the protruding part 124 protruding and extending upward from an upper surface 121c of the main body.

Further, in the joint member 120 according to the embodiment, one sides of the insertion groove 123 and an insertion groove 124a are open outward from the main body 121.

In the joint member 120 according to the embodiment, the second frame F2 and the third frame F3 with relatively long insertion lengths are not inserted into insertion grooves in longitudinal directions thereof and are directly inserted into each of the insertion grooves from an outer direction of the main body 121 as shown in FIG. 7, respectively.

Therefore, the joint member 120 according to the embodiment has an advantage in which a frame coupling process for manufacturing a chassis is more simply performed.

Third Embodiment

Figure 8:
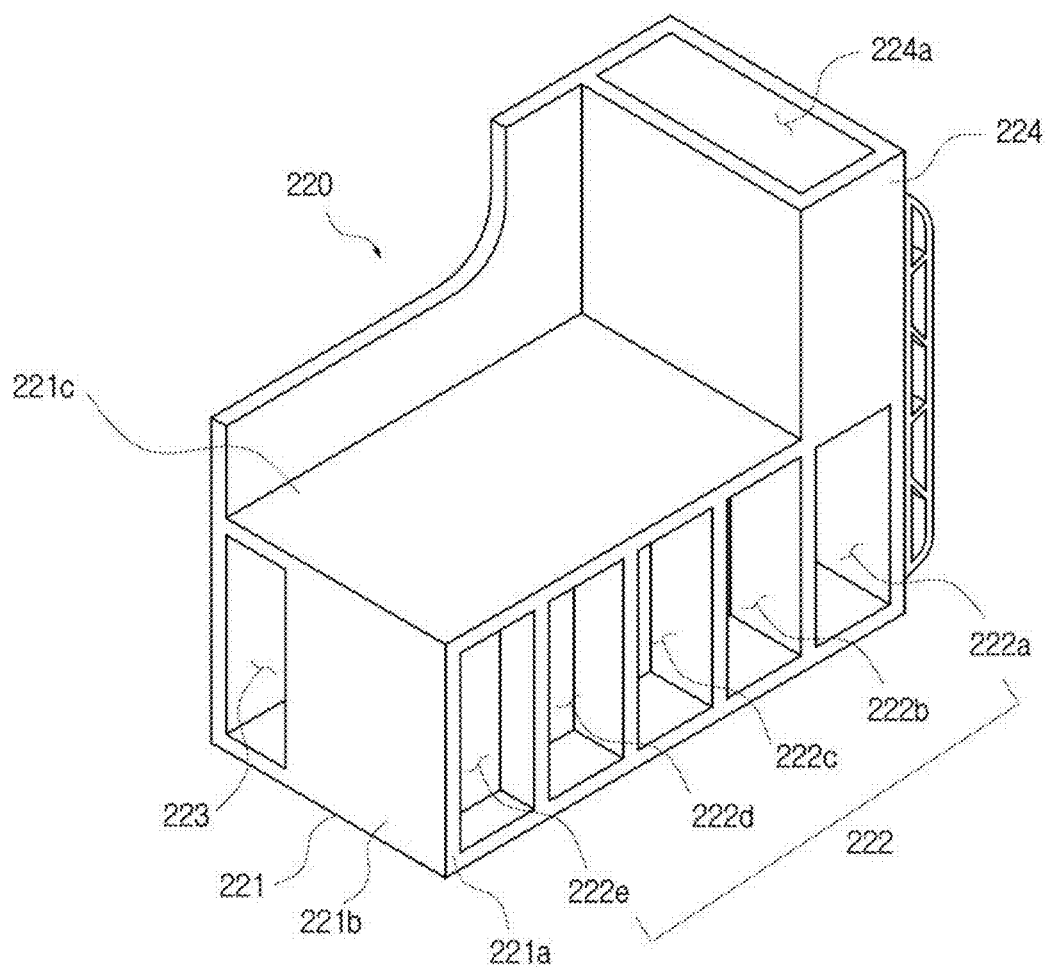
FIG. 8 is a perspective view of a joint member for coupling a chassis frame according to a third embodiment of the present invention.

FIG. 8 is a perspective view of a joint member for coupling a chassis frame according to a third embodiment of the present invention. When compared to the above-described first embodiment, a joint member 220 for coupling a chassis frame according to the embodiment is also different only in a shape of a main body, and thus a repeated description of the first embodiment will be omitted.

A joint member 220 according to the embodiment includes a block-shaped main body 221 and a plurality of insertion grooves 222 which are formed on one surface 221a of the main body 221 and into which one end portion of the first frame F1 is inserted.

Further, the joint member 220 further includes an insertion groove 223 which is formed on another surface 221b of the main body 221 and into which one end portion of the second frame F2 is inserted, and an insertion groove 224a which is formed on one side of the main body 221 and into which one end portion of the third frame F3 is inserted.

In this case, the insertion groove 224a is formed on one side of a protruding part 224 protruding and extending upward from an upper surface 221c of the main body.

Further, in the joint member 220 according to the embodiment, the main body 221 is formed in a substantially rectangular block shape, and one surface 221a of the main body is formed as a plane surface parallel to a longitudinal direction of the chassis.

Therefore, in the joint member 220 according to the embodiment, at least a part of the insertion grooves 222 have different depths so that a length and width of the chassis are changed according to a position at which the first frame F1 is inserted into the insertion groove 222.

Further, the joint member 220 according to the embodiment may be formed so that one sides of the insertion groove 223 and the insertion groove 224a are open outward from the main body 221 as described in the second embodiment.

Fourth Embodiment

Figure 9:
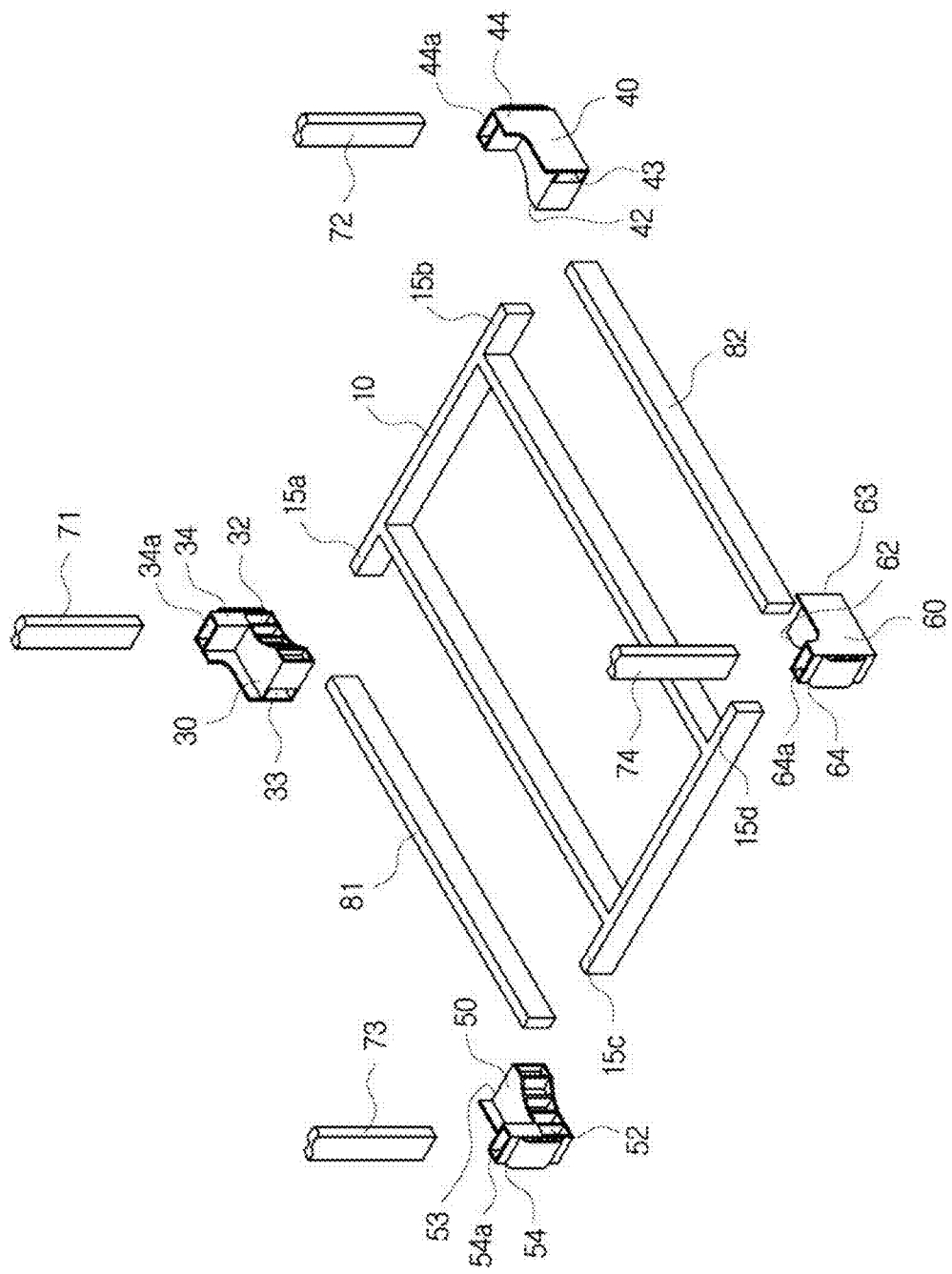
FIGS. 9, 10A, and 10B are an exploded perspective view and an assembled perspective view of a variable chassis module of a vehicle according to a fourth embodiment of the present invention.
Figure 10A:
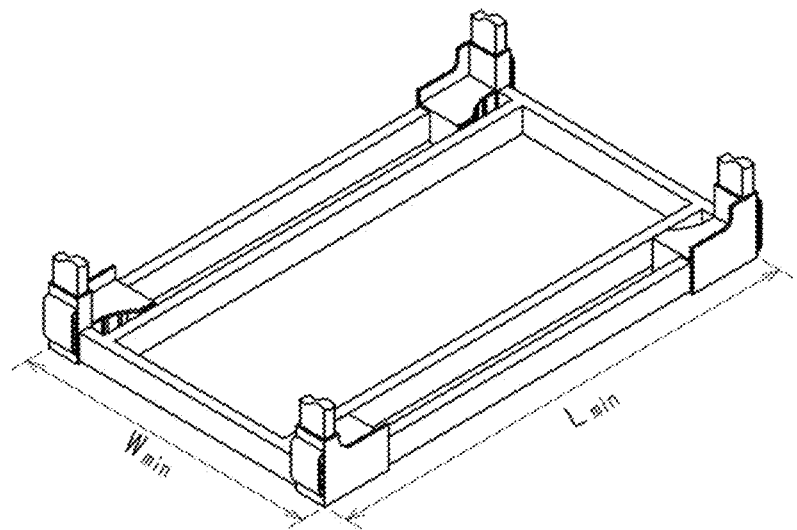
Figure 10B:
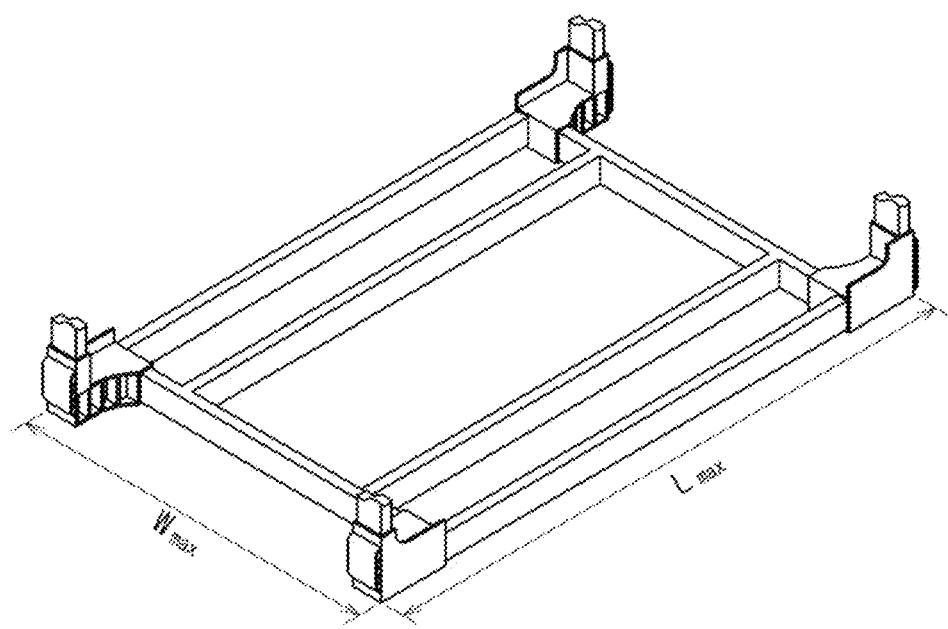

FIGS. 9, 10A, and 10B are an exploded perspective view and an assembled perspective view of a variable chassis module of a vehicle according to a fourth embodiment of the present invention.

A variable chassis module of a vehicle according to the embodiment is formed by coupling a plurality of frames that compose a chassis, and for this, the variable chassis module includes, for example, a main frame 10, joint frames 15a, 15b, 15c, and 15d, and joint members 30, 40, 50, and 60.

The main frame 10, which is to form the center module 1 shown in FIG. 1 of all chassis modules, may be formed in a substantially rectangular panel shape or rectangular frame shape, but in the embodiment, is formed in a rectangular frame as an example.

Further, the variable chassis module further includes a pair of front end module frames 71 and 72 connected with a front end module 2 of the vehicle and each disposed on upper left and right directions of the main frame 10 and a pair of rear end module frames 73 and 74 connected with a rear end module 3 of the vehicle and each disposed on lower left and right directions of the main frame 10.

Further, the joint frames 15a, 15b, 15c, and 15d each extend from edges of the main frame 10 outward in a lateral direction, which is a width direction of the chassis module, and the joint members 30, 40, 50, and 60 are each coupled to the joint frames 15a, 15b, 15c, and 15d.

In this case, the joint members 30, 40, 50, and 60 may be formed by any one of the joint members 20, 120, and 220 according to the above-described first to third embodiments, and in the embodiment, as an example, the joint members 30, 40, 50, and 60 are formed the same as the joint member 20 according to the first embodiment.

Hereinafter, an unmentioned portion of descriptions for the specific configuration of the joint members 30, 40, 50, and 60 will be replaced with descriptions of FIGS. 2 to 5 in the first embodiment in order to omit repeated descriptions, and only symbols will be represented differently.

Further, the first joint member 30 and the second joint member 40 each coupled to upper left and right sides of the main frame 10 are laterally symmetrical to each other, and the third joint member 50 and the fourth joint member 60 each coupled to lower left and right sides of the main frame 10 are vertically symmetrical to the first joint member 30 and the second joint member 40, respectively.

Hereinafter, for convenience of descriptions, the first joint member 30 coupled to an upper left side of the main frame 10 will be mainly described to describe the configuration of the joint members 30, 40, 50, and 60, and repeated descriptions for the other joint members 40, 50, and 60 will be omitted.

However, in this case, shapes of the joint members 40, 50, 60 are different from that of the first joint member 30 according to a disposed position (that is, a laterally symmetrical shape or a vertically symmetrical shape), and therefore, the joint frames 15b, 15c, and 15d each coupled thereto are different.

In the first joint member 30, an insertion groove 32, into which an end portion of the first joint frame 15a is inserted, is formed in plural on one surface (not shown) facing the first joint frame 15a, and the plurality of insertion grooves 32 are formed in a longitudinal direction of the chassis module so that the length of the chassis module is changed according to a position at which the first joint frame 15a is inserted.

Further, at least a part of the insertion groove 32 of the first joint member 30 is formed at a different position in a width direction of the chassis module so that the width of the chassis module is changed according to a position at which the first joint frame 15a is inserted.

Further, at least a part of the insertion grooves 32 of the first joint member 30 may have different depths so that a width of the chassis module is changed according to a position at which the first joint frame 15a is inserted as needed.

Similarly, the second joint member 40, the third joint member 50, and the fourth joint member 60 also include insertion grooves 42, 52, and 62 formed on one surface facing the second joint frame 15b, the third joint frame 15c, and the fourth joint frame 15d to be each coupled thereto.

Meanwhile, insertion grooves 34a and 44a into which any one of the front end module frames 71 and 72 is inserted are each formed on one sides of the first and second joint members 30 and 40 each coupled to the first and second joint frames 15a and 15b extending from upper edges of the main frame 10.

Specifically, the first joint member 30 includes the insertion groove 34a into which the first front end module frame 71 is inserted, and the second joint member 40 includes the insertion groove 44a into which the second front end module frame 72 is inserted.

Similarly, insertion grooves 54a and 64a into which any one of the rear end module frame 73 and 74 is inserted are also each formed on one sides of the third and fourth joint members 50 and 60 each coupled to the third and fourth joint frames 15c and 15d extending from lower edges of the main frame 10.

Specifically, the third joint member 50 includes the insertion groove 54a into which the first rear end module frame 73 is inserted, and the fourth joint member 60 includes an insertion groove 64a into which the second rear end module frame 74 is inserted.

In this case, the insertion grooves 34a, 44a, 54a, and 64a are formed on the protruding part 34, 44, 54, and 64 each protruding and extending upward from upper surfaces of the joint members 30, 40, 50, and 60.

Further, the variable chassis module according to the embodiment further includes a pair of side frames 81 and 82 each disposed on laterally outsides of the main frame 10 in a longitudinal direction of the chassis module as needed.

In this case, the joint members 30, 40, 50, and 60 include the insertion grooves 33, 43, 53, and 63 each formed on one surfaces facing the side frames 81 and 82 so that one end portions of the side frames 81 and 82 are inserted thereinto.

Specifically, the first and third joint members 30 and 50 include insertion grooves 33 and 53, each, into which any one of both end portions of the first side frame 81 is coupled, and the second and fourth joint members 40 and 60 include insertion grooves 43 and 63, each, into which any one of both end portions of the second side frame 82 is coupled.

In this case, the side frames 81 and 82 perform a function of reinforcing strength of a side portion of the chassis module and a function of preventing damage or deformation of the main frame 10 from an external impact by maintaining a distance with the main frame 10.

FIGS. 10A and 10B show that a chassis is manufactured using the variable chassis module according to the present invention configured as described above, and it may be noted that a chassis module, which has a length and width changed according to a position at which the joint frames 15a, 15b, 15c, and 15d are each coupled to the joint members 30, 40, 50, and 60 even when the same component is used, is manufactured.

As an example, when each of the joint frames 15a, 15b, 15c, and 15d is coupled to the joint member at a position corresponding to the insertion groove 22a of the joint member 20 described above in the first embodiment, the chassis module with the minimum length and width is manufactured (see FIG. 10A).

Further, when each of the joint frames 15a, 15b, 15c, and 15d is coupled to the joint member at a position corresponding to the insertion groove 22e of the joint member 20 described above in the first embodiment, the chassis module with the maximum length and width is manufactured (see FIG. 10B).

Meanwhile, the frames each coupled to the joint members 30, 40, 50, and 60 may be rigidly coupled to each other by welding or bolt coupling, and in the embodiment, the frames are each coupled to the joint members 30, 40, 50, and 60 by welding as an example.

Further, the chassis module manufactured as described above performs a function of supporting a vehicle body at a lower portion of the vehicle, and when the chassis module is a chassis module for an electric vehicle as in the embodiment, a battery module B is installed in the substantially rectangular main frame 10 as shown in FIG. 1 so that a bottom surface of the chassis module is formed.

Fifth Embodiment

Figure 11:
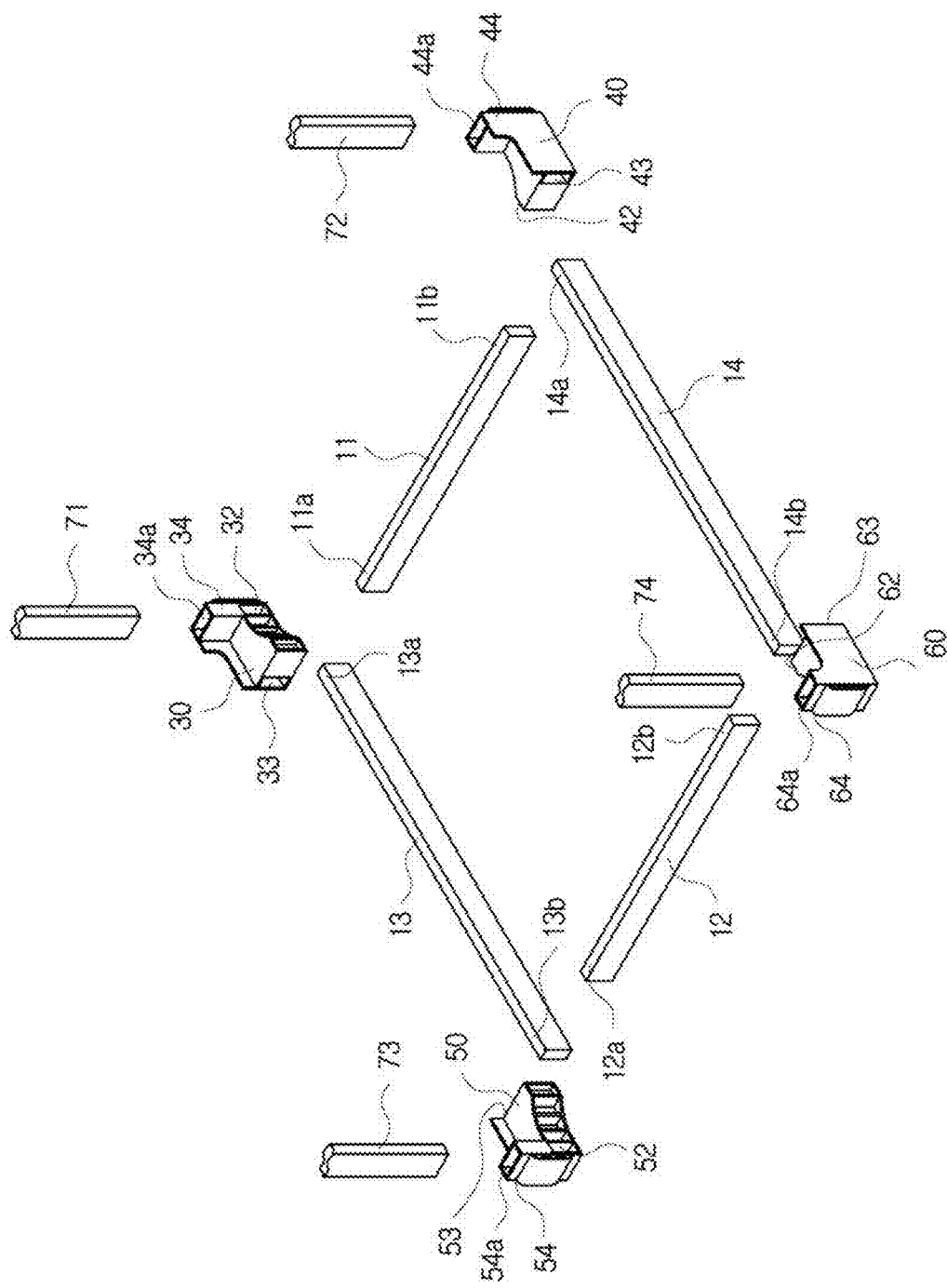
FIGS. 11, 12A, and 12B are an exploded perspective view and an assembled perspective view of a variable chassis module of a vehicle according to a fifth embodiment of the present invention.
Figure 12A:
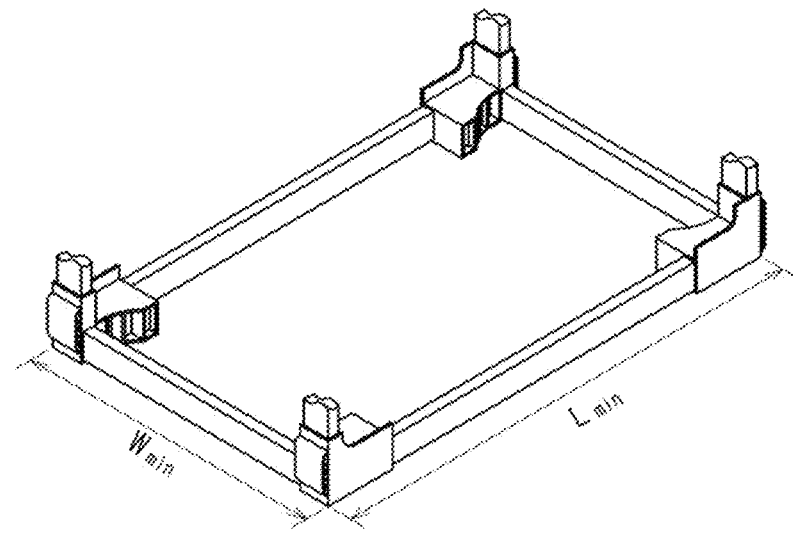
Figure 12B:
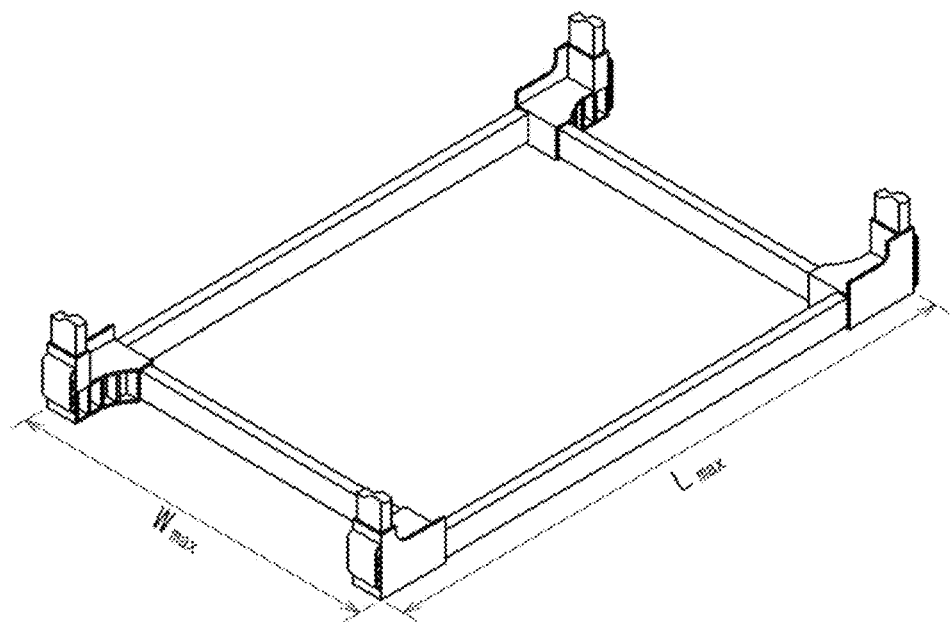

FIGS. 11, 12A, and 12B are an exploded perspective view and an assembled perspective view of a variable chassis module of a vehicle according to a fifth embodiment of the present invention.

A variable chassis module of a vehicle according to the embodiment is formed by coupling a plurality of frames composing a chassis, and, as an example, the variable chassis module includes a pair of horizontal frames 11 and 12, a pair of vertical frames 13 and 14, and joint members 30, 40, 50, and 60 for coupling the frames.

The horizontal frames 11 and 12 include a first horizontal frame 11 and a second horizontal frame 12 disposed to be spaced apart from each other in a vertical direction, and the vertical frames 13 and 14 include a first vertical frame 13 and a second vertical frame 14 each disposed on the left and right of the horizontal frames 11 and 12.

Further, the joint members 30, 40, 50, and 60 are for coupling the horizontal frames 11 and 12 and the vertical frames 13 and 14 in a substantially rectangular shape, and each of the joint members 30, 40, 50, and 60 is connected with any one of one end portions of the horizontal frames 11 and 12 and any one of one end portions of the vertical frames 13 and 14 at an edge of the rectangular shape.

Therefore, the rectangular assembly of the frame and joint member forms a center module 1 shown in FIG. 1 of all chassis modules.

Further, the variable chassis module further includes a pair of front end module frames 71 and 72 connected with a front end module 2 of the vehicle and each disposed in left and right directions of the horizontal frame (specifically, the first horizontal frame), and a pair of rear end module frames 73 and 74 connected with the rear end module 3 of the vehicle and each disposed in left and right directions of the horizontal frame (specifically, the second horizontal frame).

In this case, the joint members 30, 40, 50, and 60 may be formed by any one of joint members 20, 120, and 220 according to the above-described first to third embodiments, and in the embodiment, the joint members 30, 40, 50, and 60 are formed the same as the joint member 20 according to the first embodiment as an example.

Hereinafter, an undescribed portion of descriptions for the specific configuration of the joint members 30, 40, 50, and 60 will be replaced with descriptions of FIGS. 2 to 5 in the first embodiment in order to omit repeated descriptions, but only symbols will be differently represented.

Further, the first joint member 30 and the second joint member 40 each coupled to the left and right of the first horizontal frame 11 are laterally symmetrical to each other, and the third joint member 50 and the fourth joint member 60 each coupled to the left and right of the second horizontal frame 12 are vertically symmetrical to the first joint member 30 and the second joint member 40.

Hereinafter, for convenience of descriptions, the first joint member 30 coupled to one end portion 11a of the first horizontal frame 11 will be mainly described to describe the configuration of the joint members 30, 40, 50, and 60, and repeated descriptions for the other joint members 40, 50, and 60 will be omitted.

However, in this case, shapes of the joint members 40, 50, 60 are different from that of the first joint member 30 according to a disposed position (that is, being a laterally symmetrical shape or a vertically symmetrical shape), and therefore the type and/or direction of each of the coupled frames is changed.

The first joint member 30 includes an insertion groove 32 which is formed on one surface (not shown) facing one end portion 11a of the first horizontal frame 11 and into which the one end portion 11a of the first horizontal frame 11 is inserted, and the plurality of insertion grooves 32 are formed in a longitudinal direction of the chassis module so that the length of the chassis module is changed according to a position at which one end portion 11a of the first horizontal frame 11 is inserted.

Further, at least a part of the insertion grooves 32 of the first joint member 30 are formed at different positions in a width direction of the chassis module so that the width of the chassis module is changed according to a position at which one end portion 11a of the first horizontal frame 11 is inserted.

Further, at least a part of the insertion grooves 32 of the first joint member 30 may have different depths so that a width of chassis module is changed according to a position at which one end portion 11a of the first horizontal frame 11 is inserted.

Similarly, the second joint member 40, the third joint member 50, and the fourth joint member 60 include insertion grooves 42, 52, and 62 formed on one surface facing the other end portion 11b of the first horizontal frame 11, one end portion 12a of the second horizontal frame 12, and the other end portion 12b of the second horizontal frame 12 to be each coupled to the joint members 40, 50, and 60.

Further, the first joint member 30 includes the insertion groove 33 which is formed on one surface facing one end portion 13a of the first vertical frame 13 and into which one end portion 13a of the first vertical frame 13 is inserted.

Similarly, the second joint member 40, the third joint member 50, and the fourth joint member 60 include insertion grooves 43, 53, and 63 formed on one surface facing one end portion 14a of the second vertical frame 14, the other end portion 13b of the first vertical frame 13, and the other end portion 14b of the second vertical frame 14 to be each coupled to the joint members 40, 50, and 60.

In this case, the insertion grooves 33, 43, 53, and 63 may have depths which are deep enough to adjust insertion lengths of end portions of the vertical frames 13 and 14, and as described above in such a configuration, insertion depths of the vertical frames 13 and 14 inserted into the insertion grooves 33, 43, 53, and 63 are changed according to a case when the length of the chassis is changed according to a position at which the horizontal frames 11 and 12 are inserted into the insertion grooves 32, 42, 52, and 62.

Meanwhile, insertion grooves 34a and 44a into which any one of the front end module frames 71 and 72 is inserted are each formed on upper edge portions of the rectangular shape, that is, one sides of the first and second joint members 30 and 40 which are each coupled to both ends of the first horizontal frame 11.

Specifically, the first joint member 30 includes an insertion groove 34a into which the first front end module frame 71 is inserted, and the second joint member 40 includes an insertion groove 44a into which the second front end module frame 72 is inserted.

Similarly, insertion grooves 54a and 64a, into which any one of the rear end module frames 73 and 74 is inserted, are each formed on lower edge portions of the rectangular shape, that is, one sides of the third and fourth joint members 50 and 60 which are each coupled to both ends of the second horizontal frame 12.

Specifically, the third joint member 50 includes the insertion groove 54a into which the first rear end module frame 73 is inserted, and the fourth joint member 60 includes the insertion groove 64a into which the second rear end module frame 74 is inserted.

In this case, the insertion grooves 34a, 44a, 54a, and 64a are formed on the protruding parts 34, 44, 54, and 64 protruding and extending upward from upper surfaces of the joint members 30, 40, 50, and 60, respectively.

FIGS. 12A and 12B show that a chassis is manufactured using the variable chassis module according to the present invention configured as described above, and it may be noted that a chassis module having a length and width changed according to a position at which the horizontal frames 11 and 12 are coupled to the joint members 30, 40, 50, and 60 is manufactured even when the same component is used.

As an example, further, when each of both end portions of the horizontal frames 11 and 12 is coupled to the joint member at a position corresponding to the insertion groove 22*a* of the joint member 20 described above in the first embodiment, the chassis module with the minimum length and width is manufactured (see FIG. 12A).

Further, when each of both end portions of the horizontal frames 11 and 12 is coupled to the joint member at a position corresponding to the insertion groove 22*e* of the joint member 20 described above in the first embodiment, the chassis module with the maximum length and width is manufactured (see FIG. 12B).

Meanwhile, the frames may be each coupled to the joint members 30, 40, 50, and 60 by welding or bolt coupling, but in the embodiment of the present invention, as an example, the frames are each coupled to the joint members 30, 40, 50, and 60 by welding.

Further, the chassis module manufactured as described above performs a function of supporting a vehicle body at a lower portion of the vehicle, and when the chassis module is a chassis module for an electric vehicle as in the embodiment, a battery module B is installed in the rectangular shape formed by the horizontal frames 11 and 12 and the vertical frames 13 and 14 as shown in FIG. 1, and thus a bottom surface of the chassis module may be formed.

A plurality of insertion grooves, into which a width-directional frame of the chassis is coupled, are formed on the joint member to which a frame forming a chassis of vehicle is coupled but have different positions and depths from each other such that a length and width of chassis are easily changed according to a position at which the width-directional frame of the chassis is coupled, and thus a joint member for coupling a chassis frame and a variable chassis module of a vehicle using the same according to the embodiment can allow a chassis frame of a vehicle for small quantity batch production for various kind of product to be easily manufactured even when the same component is used.

What is claimed is:

1. A joint member for coupling a chassis frame, which couples frames composing a chassis, the joint member comprising:
    a main body which has a block shape; and
    a first insertion groove into which one end portion of a first frame, which is a frame extending in a width direction of the chassis, is inserted and which is formed in plural on one surface of the main body,
    wherein the plurality of first insertion grooves are formed in a longitudinal direction of the chassis so that a length of the chassis is changed according to a position into which the first frame is inserted.

2. The joint member of claim 1, wherein at least a part of the first insertion grooves are formed at different positions in a width direction of the chassis so that a width of the chassis is changed according to a position at which the first frame is inserted.

3. The joint member of claim 1, wherein at least a part of the first insertion grooves have different depths so that a width of the chassis is changed according to a position at which the first frame is inserted.

4. The joint member of claim 1, further comprising a second insertion groove into which one end portion of a second frame, which is a frame connected to a front end module or a rear end module of a vehicle, is inserted and which is formed on another surface of the main body.

5. The joint member of claim 4, wherein the second insertion groove is formed on a protruding part protruding and extending upward from an upper surface of the main body.

6. A variable chassis module of a vehicle, in which a plurality of frames coupled to each other form a chassis module, the variable chassis module comprising:
    a main frame which has a substantially rectangular shape;
    joint frames each extending from edges of the main frame outward in a lateral direction which is a width direction of the chassis module; and
    joint members each coupled to the joint frames,
    wherein each of the joint members includes a first insertion groove which is formed in plural on one surface facing the joint frame so that an end portion of the joint frame is inserted thereinto, and the plurality of first insertion grooves are formed in a longitudinal direction of the chassis module so that a length of the chassis module is changed according to a position at which the joint frame is inserted.

7. The variable chassis module of claim 6, wherein at least a part of the first insertion grooves of each of the joint members are formed at different positions in a width direction of the chassis module so that a width of the chassis module is changed according to a position at which the joint frame is inserted.

8. The variable chassis module of claim 6, wherein at least a part of the first insertion grooves of each of the joint members have different depths so that a width of the chassis module is changed according to a position at which the joint frame is inserted.

9. The variable chassis module of claim 6, further comprising:
    a pair of front end module frames connected with a front end module of the vehicle and each disposed in left and right directions of the main frame; and
    a pair of rear end module frames connected with a rear end module of the vehicle and each disposed in left and right directions of the main frame,
    wherein a second insertion groove into which any one of the front end module frames is inserted is formed on one side of each of the joint members coupled to the joint frames extending from upper edges of the main frame, and a third insertion groove into which any one of the rear end module frames is inserted is formed on one side of each of the joint members coupled to the joint frames extending from lower edges of the main frame.

10. The variable chassis module of claim 9, further comprising a pair of side frames each disposed on laterally outsides of the main frame in a longitudinal direction of the chassis module,
    wherein each of the joint members includes a fourth insertion groove formed on one surface facing the side frames so that one end portion of the side frame is inserted thereinto.

11. A joint member for coupling a chassis frame, which couples frames composing a chassis, the joint member comprising:
    a main body which has a block shape;
    a first insertion groove into which one end portion of a horizontal frame, which is a width-directional frame of the chassis, is inserted and which is formed in plural on a first side surface of the main body; and a second insertion groove into which one end portion of a vertical frame, which is a longitudinal direction of the chassis, is inserted and which is formed on a second side surface of the main body, the second side surface being adjacent to the first side surface, wherein the plurality of first insertion grooves are formed in a longitudinal direction of the chassis so that a length of the chassis is changed according to a position at which the horizontal frame is inserted.

12. The joint member of claim 11, wherein an insertion depth of the vertical frame inserted into the second insertion groove is changed according to a case when a length of the chassis is changed according to a position at which the horizontal frame is inserted.

13. The joint member of claim 12, wherein at least a part of the first insertion grooves are formed at different positions in a width direction of the chassis so that a width of chassis is changed according to a position at which the horizontal frame is inserted.

14. The joint member of claim 12, wherein at least a part of the first insertion grooves have different depths so that a width of chassis is changed according to a position at which the horizontal frame is inserted.

15. The joint member of claim 11, further comprising a third insertion groove into which one end portion of a perpendicular frame, which is a frame connected with a front end module or a rear end module of the vehicle, is inserted and which is formed on one side of the main body.

16. A variable chassis module of a vehicle, in which a plurality of frames coupled to each other form a chassis module, the variable chassis module comprising:
a pair of horizontal frames disposed to be spaced apart from each other in a vertical direction;
a pair of vertical frames each disposed on the left and right of the horizontal frame; and
joint members each connected to edges of a rectangular shape so that the horizontal frames and the vertical frames are coupled to each other in the rectangular shape,
wherein each of the joint members includes a first insertion groove formed in plural on a first side surface facing the horizontal frame so that one end portion of the horizontal frame is inserted thereinto, and a second insertion groove formed on a second side surface facing the vertical frame so that one end portion of the vertical frame is inserted thereinto, wherein the plurality of first insertion grooves are formed in a longitudinal direction of the chassis module so that a length of the chassis module is changed according to a position at which the horizontal frame is inserted.

17. The variable chassis module of claim 16, wherein an insertion depth of the vertical frame inserted into the second insertion groove is changed according to a case when a length of the chassis module is changed according to a position at which the horizontal frame is inserted.

18. The variable chassis module of claim 17, wherein at least a part of the first insertion grooves of each of the joint members are formed at different positions in a width direction of the chassis module so that a width of the chassis module is changed according to a position at which the horizontal frame is inserted.

19. The variable chassis module of claim 17, wherein at least a part of the first insertion grooves of each of the joint members have different depths so that a width of the chassis module is changed according to a position at which the horizontal frame is inserted.

20. The variable chassis module of claim 16, further comprising:
a pair of front end module frames connected with a front end module of the vehicle and each disposed in left and right directions of the horizontal frame; and
a pair of rear end module frames connected with a rear end module of the vehicle and each disposed in left and right directions of the horizontal frame,
wherein a third insertion groove into which any one of the front end module frames is inserted is formed on one side of each of the joint members connected to upper edges of the rectangular shape, and a fourth insertion groove into which any one of the rear end module frames is inserted is formed on one side of each of the joint members connected to lower edges of the rectangular shape.

* * * * *